United States Patent
Vautrin et al.

(10) Patent No.: US 8,798,060 B1
(45) Date of Patent: Aug. 5, 2014

(54) CONVERTING BETWEEN TUNNELING PROTOCOLS

(75) Inventors: Olivier Vautrin, Foster City, CA (US); Reinaldo Penno, San Jose, CA (US); Sarat Kamisetty, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 263 days.

(21) Appl. No.: 12/964,473

(22) Filed: Dec. 9, 2010

Related U.S. Application Data (60) Provisional application No. 61/405,257, filed on Oct. 21, 2010.

(51) Int. Cl.
*H04L 12/66* (2006.01)

(52) U.S. Cl.
USPC ...... 370/392; 370/395.52; 370/401; 370/466; 709/230; 709/245

(58) Field of Classification Search
None
See application file for complete search history.

(56) References Cited

U.S. PATENT DOCUMENTS

| | | | |
|---|---|---|---|
| 6,523,068 B1 | 2/2003 | Beser et al. | |
| 7,188,191 B1 * | 3/2007 | Hovell et al. | 709/245 |
| 7,277,453 B2 | 10/2007 | Chin et al. | |
| 7,764,686 B1 | 7/2010 | Toebes et al. | |
| 8,131,863 B2 | 3/2012 | Takeda et al. | |
| 2004/0052257 A1 | 3/2004 | Abdo et al. | |
| 2004/0162909 A1 * | 8/2004 | Choe et al. | 709/230 |
| 2006/0062248 A1 | 3/2006 | Huang et al. | |
| 2006/0227792 A1 | 10/2006 | Wetterwald et al. | |
| 2007/0160065 A1 | 7/2007 | Mundra et al. | |
| 2007/0198735 A1 | 8/2007 | Kim et al. | |
| 2010/0202459 A1 * | 8/2010 | Tsuchiya et al. | 370/392 |
| 2012/0110210 A1 * | 5/2012 | Huang et al. | 709/246 |
| 2012/0207168 A1 | 8/2012 | Kassi Lahlou et al. | |

OTHER PUBLICATIONS

Durand et al., "Dual-Stack Lite Broadband Deployments Following IPv4 Exhaustion," draft-ietf-softwire-dual-stack-lite-06, Internet-Draft, Aug. 11, 2010, 35 pp.
Hankins et al., "Dynamic Host Configuration Protocol for IPv6 (DHCPv6) Options for Dual-Stack Lite," draft-ietf-softwire-ds-lite-tunnel-option-03, Internet-Draft, Jun. 24, 2010, 9 pp.
Brockners et al., "Gateway Initiated Dual-Stack Lite Deployment," draft-ietf-softwire-gateway-init-ds-lite-00, Internet-Draft, May 13, 2010, 15 pp.
Townsley et al., "IPv6 Rapid Development on IPv4 Infrastructures (6rd)," draft-ietf-softwire-ipv6-6rd-10, May 19, 2010, 20 pp.
Wikipedia entry, "Path MTU Discovery," last modified Sep. 16, 2010, 2 pp., http://en.wikipedia.org/wiki/Path_MTU_Discovery.

(Continued)

*Primary Examiner* — Chi Pham
*Assistant Examiner* — Shick Hom
(74) *Attorney, Agent, or Firm* — Shumaker & Sieffert, P.A.

(57) ABSTRACT

An example network device includes one or more network interface cards and a control unit. The network interface cards are configured to send and receive messages with a first network operating in accordance with a first network-layer protocol and a second network operating in accordance with a second network-layer protocol and a control unit. The control unit is configured to receive a message via the one or more network interface cards, transform the message from conforming to a first transitioning protocol to conforming to a second transitioning protocol, and forward the message via the second network.

21 Claims, 6 Drawing Sheets

(56) References Cited

OTHER PUBLICATIONS

PowerPoint presentation, "Softwires," G6 Association, dated Sep. 22, 2008, 7 pp., http://www.afrinic.net/training/presentation/Slides%20Softwires.pdf.

Carpenter et al., "Connection of IPv6 Domains via IPv4 Clouds," RFC 3056, Feb. 2001, 20 pp.
Despres, "IPv6 Rapid Deployment on IPv4 Infrastructures (6rd)," RFC 5569, Jan. 2010, 11 pp.
U.S. Appl. No. 12/952,908, by Tarun Saxena, filed Nov. 23, 2010.

* cited by examiner

CONVERTING BETWEEN TUNNELING PROTOCOLS

This application claims the benefit of U.S. Provisional Patent Application 61/405,257 filed Oct. 21, 2010, the entire content of which is incorporated herein by reference.

TECHNICAL FIELD

This disclosure relates to computer networks, and more specifically, deploying Internet Protocol version 6 across computer networks.

BACKGROUND

A computer network is a collection of interconnected devices that can exchange data and share resources according to one or more communication protocols. The communication protocols define the format and manner in which the devices communicate the data. Example protocols include the Transmission Control Protocol (TCP) and the Internet Protocol (IP) that facilitate data communication by dividing the data into small blocks called packets. These packets are individually routed across the network from a source device to a destination device. The destination device extracts the data from the packets and assembles the data into its original form. Dividing the data into packets enables the source device to resend only those individual packets that may be lost during transmission. The protocols define the format and construction of the packet, including header and payload portions of the packets.

Periodically, it is necessary to transition from one communication protocol to another. This may occur, for example, when a current communication protocol used within a network is upgraded to a newer version. As one example, the Internet is currently based on a communication protocol known as Internet Protocol version 4 (IPv4). IPv4 offers a ubiquitous network service, based on datagram (connectionless) operation, and on globally significant IP addresses to aid routing. It is becoming clear that certain elements of IPv4 are insufficient to support the growth of the Internet. For example, IPv4 makes use of a 32-bit address space. Internet Protocol version 6 (IPv6), however, makes use of a much larger 128-bit address space. However, development, standardization, implementation, testing, debugging and deployment of a new communication protocol can take a very large amount of time and energy, and is not guaranteed to lead to success.

A variety of approaches may be used in an attempt to provide a smooth transition from one communication protocol to another. For example, one approach makes use of encapsulation. Packets conforming to the new communication protocol, for example, may be encapsulated within packets conforming to the old communication protocol for transmission via devices or other network resources that do not yet support the new communication protocol. One example of such a protocol, commonly referred to as the "6 to 4" protocol, is described in Request for Comments ("RFC") 3056, entitled "Connection of IPv6 Domains via IPv4 Clouds" to K. Moore, February 2001, the entire content of which is incorporated herein by reference. In general, the 6 to 4 protocol relies upon 6 to 4 relays that encapsulate an IPv6 packet within an IPv4 packet prior to forwarding the IPv4 packet along an IPv4 network and decapsulate an IPv6 packet from an IPv4 packet prior to forwarding the IPv6 packet along an IPv6 network. According to the 6 to 4 protocol, the IPv6 network address of the 6 to 4 host included within the header of the IPv6 packet includes an IPv4 address of the 6 to 4 host appended to a well-known "6 to" IPv6 header that is the same for all 6 to 4 hosts.

However, according to the 6 to 4 protocol, all IPv6 packets include the same well-known IPv6 header and, thus, may be processed by any 6 to 4 relay managed by any Internet Service Provider (ISP). Therefore, there is no guarantee that all native IPv6 hosts have a functioning route to a 6 to 4 relay. There is also no guarantee that a 6 to 4 host is reachable by all native IPv6 hosts. Furthermore, the ISP that operates a 6 to 4 relay has no control over which hosts use the 6 to 4 relay, which limits the inceptive to maintain a high quality of service as traffic grows. In some examples, the ISP may elect not to forward any traffic that does not include a source or destination address that is outside of the network addresses associated with the ISP, resulting in packet loss.

Another example of a protocol that makes use of encapsulation to provide a smoother transition from IPv4 to IPv6 is described in RFC 5569, entitled "IPv6 Rapid Deployment on IPv4 Infrastructures" to R. Despres, January 2010, the entire content of which is incorporated herein by reference, and is commonly referred to as the "6rd" protocol. In general, the 6rd protocol relies upon 6rd relays that encapsulate and decapsulate packets similarly to the 6 to 4 protocol. In contrast to the 6 to 4 protocol, the 6rd protocol requires that an IPv6 network address associated with the IPv6 packet includes the IPv4 address of the 6rd host appended to an IPv6 header that is uniquely defined for each ISP. Because the IPv6 header is defined for each ISP, each ISP may guarantee that each 6rd host (e.g., an end user device that implements the 6rd protocol) will be reachable from all native IPv6 hosts. Furthermore, each ISP maintains full responsibility for the quality of service experience by its own customers because each relay server responsible for processing packets having the IPv6 header defined for each ISP is within each ISP's control.

However, while the 6 to 4 protocol is widely implemented, the 6rd protocol is not as widely implemented. For example, various versions of the Windows® operating system developed by Microsoft® (e.g., Windows® 7) as well as various version of the OS X operating system developed by Apple® (e.g., OS X Snow Leopard®) implement the 6 to 4 protocol, but do not implement the 6rd protocol. The limitations of the 6 to 4 protocol described above combined with the minimal implementation of the 6rd protocol make it difficult for ISPs to deploy IPv6 to end users.

SUMMARY

In general, this disclosure is directed to techniques for smoothly transitioning a network from a first network-layer (i.e., layer three) protocol to a second network-layer protocol. Layer three refers to the third layer of the Open Systems Interconnection (OSI) reference model. More specifically, this disclosure describes techniques by which a network device converts network packets between two different tunneling protocols, wherein each tunneling protocol (referred to herein as a "transitioning protocol") uses a different format for tunneling network packets of one network-layer protocol over a network that implements a second network-layer protocol. The techniques leverage network address translation (NAT) techniques to implement a rule that transforms the tunneled packet from the first transitioning protocol to the second transitioning protocol.

In some examples, a network device receives an Internet Protocol version 4 (IPv4) packet via an IPv4 network. The IPv4 packet may encapsulate an Internet Protocol version 6 (IPv6) packet configured in accordance with a transitioning protocol, such as the 6 to 4 protocol or the 6rd protocol. Upon receiving the IPv4 packet, the network device decapsulates the IPv6 packet from the IPv4 packet and applies a network address translation rule to convert the IPv6 packet from being configured in accordance with a first transitioning protocol to being configured in accordance with a second transitioning protocol. When the IPv6 packet includes a network address configured in accordance with the 6 to 4 protocol, for example, the techniques enable the network device to convert the network address into a network address configured in accordance with the 6rd protocol prior to forwarding the packet along an IPv6 network. In this manner, the network device may transform tunneled packets from the first transition protocol to the second transition protocol and forward the packet along an IPv6 network.

In other examples, the network device receives IPv6 packet configured in accordance with a transitioning protocol via an IPv6 network, but is configured to forward the IPv6 packet via an IPv4 network. When forwarding the packet via an IPv4 network, the network device applies the network address translation rule to convert the IPv6 packet from being configured in accordance with a first transitioning protocol into an IPv6 packet configured in accordance with a second transitioning protocol prior to encapsulating the IPv6 packet in an IPv4 packet and forwarding the IPv4 packet along the IPv4 network. In this manner, the network device may process IPv6 packets configured in accordance with a first transitioning protocol and received via an IPv6 network, transform the IPv6 packets to being configured in accordance with a second transitioning protocol, and forward the transformed IPv6 packets along an IPv4 network.

In one example, a method includes receiving, with a network device, a message via a first network, wherein the message conforms to a first transitioning protocol, and wherein the network device couples the first network operating in accordance with a first network-layer protocol with a second network operating in accordance with a second network-layer protocol. The method also includes transforming, with the network device, the message from conforming to the first transitioning protocol to conforming to a second transitioning protocol, and forwarding, with the network device, the message via the second network.

In another example, a network device includes one or more network interface cards and a control unit. The network interface cards are configured to send and receive messages with a first network operating in accordance with a first network-layer protocol and a second network operating in accordance with a second network-layer protocol and a control unit. The control unit is configured to receive a message via the one or more network interface cards, transform the message from conforming to a first transitioning protocol to conforming to a second transitioning protocol, and forward the message via the second network.

In another example, a computer-readable storage medium is encoded with instructions for causing one or more programmable processors to receive a message via a first network, message conforms to a first transitioning protocol, and wherein the network device couples the first network operating in accordance with a first network-layer protocol with a second network operating in accordance with a second network-layer protocol. The instructions further cause the one or more processors to transform the message from conforming to the first transitioning protocol to conforming to a second transitioning protocol, and forward the message via the second network.

The techniques of this disclosure may provide one or more advantages. For example, the techniques described herein may allow a network device (e.g., a network relay) to combine the widely implemented, but flawed 6 to 4 protocol with the minimally implemented, but more functional 6rd protocol to smooth the transition from IPv4 to IPv6. By implementing an additional network address translation rule to transform packets from a first transitioning protocol to a second transitioning protocol, the advantages of the 6 to 4 protocol may be combined with the advantages of the 6rd protocol.

The details of one or more embodiments of the techniques of this disclosure are set forth in the accompanying drawings and the description below. Other features, objects, and advantages will be apparent from the description and drawings, and from the claims.

DETAILED DESCRIPTION

Figure 1:
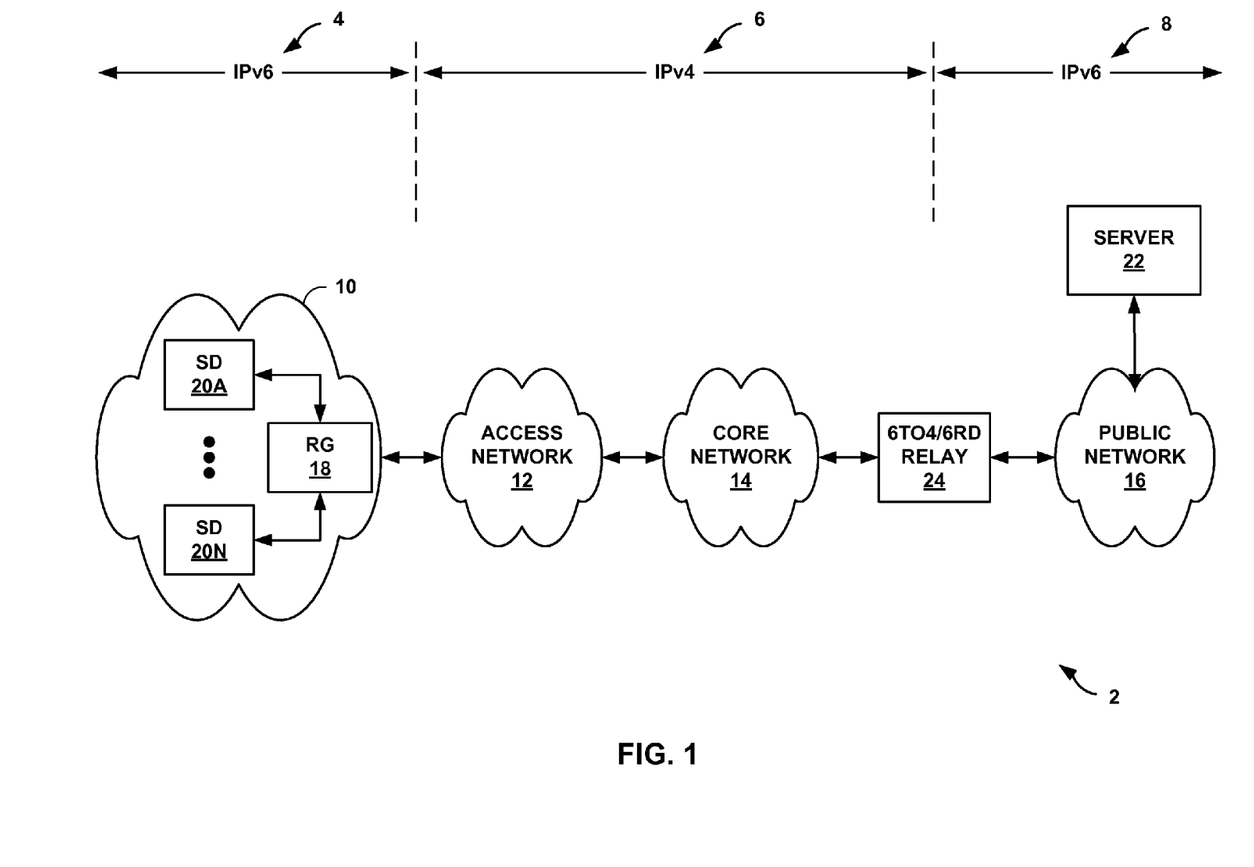
FIG. 1 is a block diagram illustrating an example computer network system.

FIG. 1 is a block diagram illustrating an example computer network system 2 in which subscriber devices (SD) 20A-20N (collectively, "subscriber devices 20") and server 22 exchange data. As illustrated in FIG. 1, network system 2 includes subscriber network 10, access network 12, core network 14, and public network 16. Each network within network system 2 may operate in accordance with one or more network-layer protocols (i.e., layer three of the OSI model). As illustrated in FIG. 1, different segments of network system 2 operate in accordance with different network-layer protocols. For example, network segments 4 and 8 operate in accordance with Internet Protocol version 6 (IPv6) as described in request for comments (RFC) 2460, entitled "Internet Protocol, Version 6 (IPv6) Specification" to S. Deering et al., December 1998, the entire content of which is incorporated herein by reference. As another example, network segment 6 operates in accordance with Internet Protocol version 4 (IPv4) as described in RFC 791, entitled "Internet Protocol" to Jon Postel et al., September 1981, the entire content of which is incorporated herein by reference.

As illustrated in FIG. 1, subscriber network 10 and public network 16 send and receive network messages in accordance with IPv6. Access network 12 and core network 14 send and receive network messages in accordance with IPv4. While described as implementing IPv4, access network 12 and core network 14 may also implement IPv6 or a combination of IPv4 and IPv6. Similarly, although described as implementing IPv6, subscriber network 10 and public network 16 may also implement IPv4 or a combination of IPv4 and IPv6.

Subscriber network 10 includes residential gateway (RG) 18 and subscriber devices 20. Residential gateway 18 provides a gateway by which the subscriber devices 20 connect to access network 12 and thereby access public network 16. Residential gateway 18 typically comprises a wireless router or other home networking device, such as a hub, a switch, a router, a cable modem, a digital subscriber line (DSL) modem or any other device that provides access or otherwise connects subscriber devices 20 to public network 16 or other wide area network (WAN). Typically, subscriber devices 20 are connected to residential gateway 18 via wired or wireless network protocols, such as Ethernet or 802.11g. Examples of subscriber devices 20 include personal computers, laptop computers, workstations, tablet computers, personal digital assistants (PDAs), wireless device, network-ready appliances, and the like. Residential gateway 18 and subscriber devices 20 may implement IPv6 or IPv4 or a combination IPv4 and IPv6.

Access network 12 may represent a public network that is owned and operated by an Internet service provider (ISP) to provide network access to one or more subscriber devices 20. As a result, access network 12 may be referred to herein as a service provider (SP) network. Access network 12 may connect to one or more customer networks (e.g., subscriber network 10). While the example network system 2 illustrated in FIG. 1 includes one access network 12, other examples may include multiple access networks 12, each of which may send and receive messages via core network 14. Core network 14 may represent the "backbone" of the service provider network and may operate to connect multiple access networks. Typically, core network 14 includes high capacity communication facilities that provide paths for the exchange of information between one or more access networks 6 to public network 16.

Public network 16 may comprise any set of one or more interconnected public networks, such as the Internet. Public network 16 may include other conventional network devices, such as routers, media gateways, switches, hubs, and network accelerators, to communicate data between subscriber devices 20 and server 22. Server 22 represents any device that provides one or more network resources accessible to subscriber devices 20. For example, server 22 may include email servers, domain controllers, web servers, print servers, printers, network copiers, gateways, intelligent switches, hubs, routers or other network access points or devices.

The 6TO4/6RD relay 24 may comprise a layer two (L2) switch, a layer three (L3) router or another type of network device that facilitates the transfer of data within network system 2. In some examples, relay 24 may also perform bridging functions, firewall functions, intrusion detection functions, security functions, or other network functions. Further, although shown and described as providing L3 services, relay 24 may be any network element that provides services for other layers of the network stack. As one example, relay 24 may be a network router that integrates L2 and L3 services so as to provide L2 forwarding services as well as L3 routing functions. As shown in the example of FIG. 1, relay 24 is connected to core network 14 and public network 16 and exchanges data between core network 14 and public network 16. In other examples, relay 24 may be connected to access network 12 and core network 14. Generally, relay 24 may be placed at the edge of any access network, service provider network, or public network.

In accordance with the techniques of this disclosure, relay 24 is configured to receive network packets configured in accordance with a first transitioning protocol and transform the network packets to be configured in accordance with a second transitioning protocol. In one example, subscriber devices 20 implement the 6 to 4 protocol. In this example, subscriber network 10 and public network 16 are configured as IPv6 networks. An ISP that operates access network 12 and/or core network 14, which are both configured as IPv4 networks, assigns a unique IPv4 network address to residential gateway 18. When one of subscriber devices 20 (e.g., subscriber device 20A) sends an outgoing network packet, subscriber device 20A first configures the network packet as an IPv6 packet in accordance with the 6 to 4 protocol. That is, the IPv6 packet includes an IPv6 header that includes IPv6 source and destination network addresses. The IPv6 source network address comprises the well-known "6 to" prefix (i.e., 2002/16) prepended to the IPv4 network address of residential gateway 18 The IPv6 destination network address is the IPv6 network address of server 22. That is, the IPv6 packet tunnels IPv4 information, e.g., the IPv4 network address of residential gateway 18, in an IPv6 packet.

After generating the IPv6 packet, subscriber device 20A forwards the IPv6 network packet to residential gateway 18. Residential gateway 18 provides an ingress to the 6 to 4 tunnels that are used by the first network-layer protocol for transitioning between two network layer protocols and providers an egress for 6 to 4 tunnels that carry traffic from the residential gateway 18 to access network 12. Residential gateway 18 encapsulates the IPv6 packet within an IPv4 network packet as defined in the 6 to 4 protocol prior to forwarding the network packet to access network 12. The IPv4 network packet includes an IPv4 source address that includes the unique IPv4 network address assigned to the residential gateway 18 by the ISP. The IPv4 network packet also includes an IPv4 destination address that is set to the IPv4 address of a well-known 6 to 4 relay. In the example shown in FIG. 1, the IPv4 destination address is set to the IPv4 address assigned to relay 24. Residential gateway 18 then forwards the IPv4 packet towards relay 24 via access network 12 and core network 14. As described in this example, packets traveling between subscriber devices 20 and relay 24 are configured in accordance with a first tunneling protocol, e.g., the 6 to 4 protocol.

Upon receiving the IPv4 packet from residential gateway 18, relay 24 decapsulates the IPv6 packet from the IPv4 packet and applies a network address translation (NAT) rule to transform the packet from a first transitioning protocol packet into a second transitioning protocol packet. That is, the NAT rule changes the IPv6 source network address from a 6 to 4 network address into a 6rd network address. The NAT rule causes relay 24 to extract the IPv6 source address that includes the "6 to" prefix and the IPv4 network address of residential gateway 18, remove the "6 to" prefix, and prepend the 6rd prefix assigned to the ISP associated with access network 12 and/or core network 14 to the source IPv4 address to generate the 6rd source address. After applying the NAT rule, the IPv6 packet is transformed from a packet configured in accordance with a first transitioning protocol (e.g., 6 to 4) to a packet configured in accordance with a second transitioning protocol (e.g., 6rd). The 6rd packet tunnels the IPv4 address of residential gateway 18 within the 6rd IPv6 source address. Upon generating the 6rd packet, relay 24 forwards the 6rd packet to public network 16. In this manner, relay 24 applies a NAT rule to convert an IPv4 packet that tunnels IPv6 information across an IPv4 network into an IPv6 packet that tunnels IPv4 information across an IPv6 network.

In examples where relay 24 receives network packets from public network 16 (e.g., from server 22), relay 24 examines the network packets to determine the destination of the network packets and to determine whether the network packets are configured in accordance with the 6rd protocol. For example, when relay 24 receives a packet from server 22 that includes a destination network address that corresponds to residential gateway 18 and is configured in accordance with the 6rd protocol, relay 24 applies a NAT rule to transform the 6rd destination address into a 6 to 4 destination address. In applying the NAT rule, relay 24 removes the 6rd prefix from the IPv6 destination address leaving the IPv4 network address associated with residential gateway 18. Relay 24 then prepends the well-known 6 to 4 prefix, "2002/16," to the IPv4 network address to generate a new IPv6 destination address configured in accordance with the 6 to 4 protocol.

After generating the new IPv6 destination address, relay 24 encapsulates the IPv6 network packet within an IPv4 network packet. The IPv4 packet includes an IPv4 destination address set to the IPv4 network address of the residential gateway 18 and an IPv4 source address set to the IPv4 network address of relay 24. Relay 24 then forwards the IPv4 network packet to residential gateway 18 via core network 14 and access network 12. Upon receiving the IPv4 packet from relay 24, residential gateway 18 decapsulates the IPv6 packet from the IPv4 packet and forwards the IPv6 packet to the appropriate one of subscriber devices 20. In this manner, relay 24 applies a NAT rule to convert an IPv6 packet that tunnels IPv4 information over an IPv6 network into an IPv4 packet that tunnels IPv6 information over an IPv4 network.

Typically, the IPv4 network address assigned to residential gateway 18 is universally unique in that there is only one network device assigned to the network address assigned to residential gateway 18. However, in some examples, the techniques of this disclosure enable an ISP to utilize private network address that may only be unique within the networks provided by the ISP. Private network addresses are typically reused within private network, such as subscriber network 10, and are associated with one public network address (i.e., a universally unique network address) that is assigned to a network gateway. In general, the network gateway directs the inbound packets directed to devices within the private network by using NAT. Similar techniques may be applied on a larger scale by service providers or enterprises that implement the techniques of this disclosure. The techniques of this disclosure allow the IPv4 network address assigned to each device within the service provider network need only be unique within the service provider network. By prepending a unique 6rd prefix associated with a particular service provider to a private IPv4 network address that may only be unique within the service provider network, a universally unique IPv6 network address is generated.

While shown in the example illustrated in FIG. 1 as coupling core network 14 and public network 16, in other examples, relay 24 may couple access network 12 and core network 14. In these other examples, relay 24 may apply NAT to change the source or destination network address in a substantially similar manner as described above. In general, relay 24 is placed between access network 12 and core network 14 in examples where core network 14 operates as an IPv6 network and access network 12 operates as an IPv4 network.

In this manner, relay 24 may enable an ISP to combine the advantages of the 6 to 4 protocol with the advantages of the 6rd protocol. That is, relay 24, in various instances, enables a service provider or an enterprise to combine the widely implemented, but flawed 6 to 4 protocol with the minimally implemented, but more functional 6rd protocol. By combining the advantages of the 6 to 4 and 6rd protocols, the techniques of this disclosure may enable a smoother transition from IPv4 networks to IPv6 networks.

Figure 2:
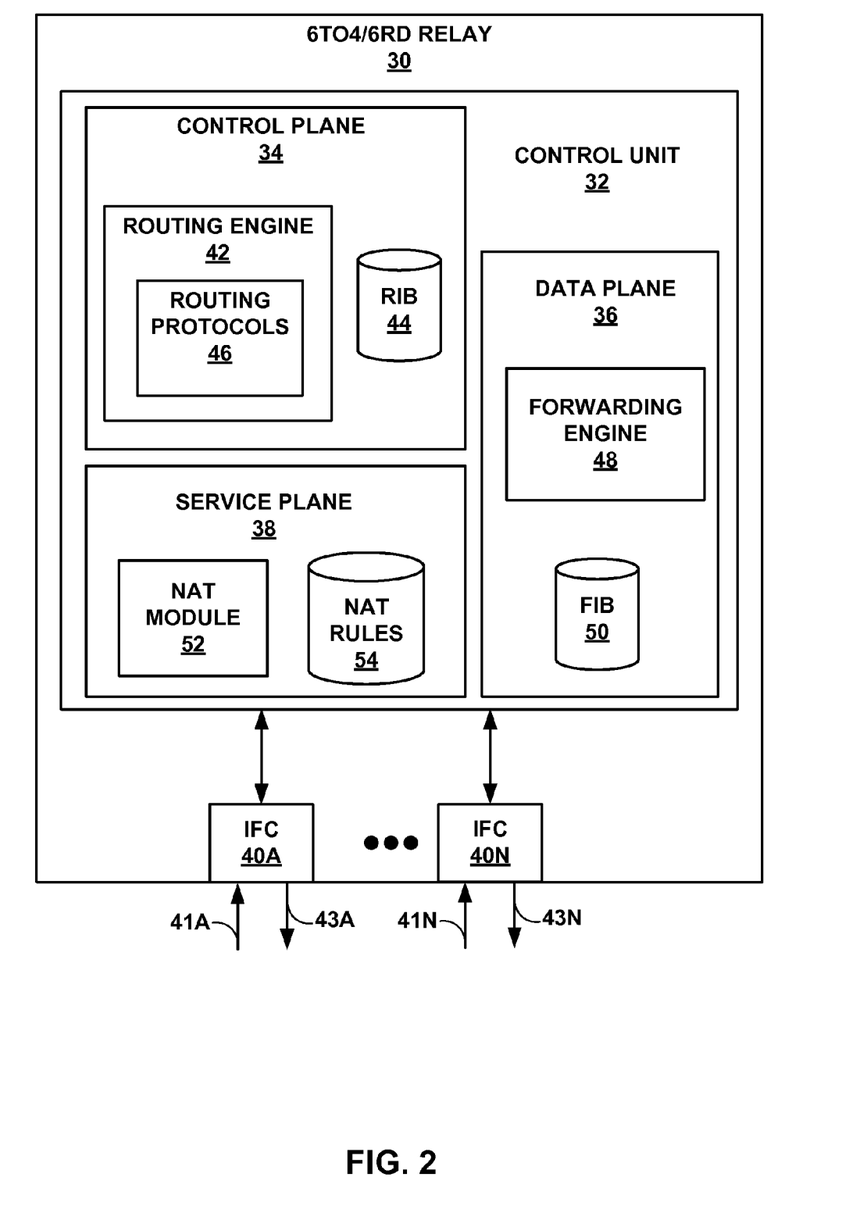
FIG. 2 is a block diagram illustrating an example network device that may implement the techniques of this disclosure.

FIG. 2 is a block diagram illustrating an example 6TO4/6RD relay 30 that may implement the techniques of this disclosure. For purposes of illustration, relay 30 may be described below within the context of the example network system 2 of FIG. 1 and may represent relay 24. In this example embodiment, relay 30 includes control unit 32 and interface cards (IFCs) 40A-40N (collectively, "IFCs 40") that send and receive packet flows or network traffic via inbound network links 41A-41N (collectively, "inbound links 41") and outbound network links 43A-43N (collectively, "outbound links 43"). Relay 30 typically include a chassis (not shown in the example of FIG. 2) having a number of slots for receiving a set of cards, including IFCs 40. Each card may be inserted into a corresponding slot of a chassis for communicably coupling the card to a control unit 32 via a bus, backplane, or other electrical communication mechanism. IFCs 40 are typically coupled to network links 41 via a number of interface ports (not shown), and forward and receive packets and control information from control unit 32 via respective paths (which, for ease of illustration purposes, are not explicitly denoted in FIG. 2).

Control unit 32 may include one or more processors (not shown in FIG. 2) that execute software instructions, such as those used to define a software or computer program, stored to a computer-readable storage medium (again, not shown in FIG. 2), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, control unit 32 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 32 may also be divided into three logical or physical "planes" to include a first control or routing plane 34, a second data or forwarding plane 36, and a third service plane 38. That is, control unit 32 may implement three separate functionalities, e.g., the routing, forwarding and service functionalities, either logically, e.g., as separate software instances executing on the same set of hardware components, physically, e.g., as separate physical dedicated hardware components that either statically implement the functionality in hardware or dynamically execute software or a computer program to implement the functionality, or some combination of logical and physical implementations. Often, control plane 34 may logical implement service plane 38 in that service plane 38 is provided as a virtual service plane executing within control plane 34. In this virtualized service plane implementation, control plane 34 may be considered to perform the functions attributed to service plane 38 below and in some instances this disclosure may ignore this virtualization and refer to NAT module 52 executing within control plane 34. In this respect, NAT module 52 may execute within either service plane 38 when a dedicated service plane 38 is implemented or within control plane 34 when service plane 38 executes as a virtualized service plane 38 in a virtual environment provided by control plane 34.

Control plane 34 of control unit 32 may provide the routing functionality of relay 30. In this respect, control plane 34 may represent hardware or a combination of hardware and software of control unit 32 that implements routing protocols 46 by which routing information stored within routing information base (RIB) 44 may be determined. The routing information may include information defining a topology of a network, such access network 12. Control plane 34 may resolve the topology defined by the routing information to select or determine one or more routes through access network 12.

Control plane 34 may then update data plane 36 with these routes, where data plane 36 maintains these routes as forwarding information stored within forwarding information base (FIB) 50. Forwarding or data plane 36 may include forwarding engine 48, which may be implemented in hardware or a combination of hardware and software of control unit 32 that forwards network traffic in accordance with the forwarding information. Service plane 38 may represent hardware or a combination of hardware and software of control unit 32 responsible for providing and managing one or more services, such as a NAT service. RIB 44 and FIB 50 may each be stored in the form of one or more tables, databases, linked lists, radix trees, or other suitable data structure.

Service plane 38 provides an operating environment for service-related modules, including NAT module 52. Initially, upon powering up or otherwise enabling relay 30, control unit 32 loads, configures and executes NAT module 52. In general, NAT module 52 applies NAT rules stored within NAT rules 54 to certain packets received via IFCs 40. NAT rules 54 may be stored in the form of one or more tables, databases, linked lists, radix trees, or other suitable data structure. In some examples NAT rules 54 includes conventional NAT rules that are applied by NAT module 52 to perform conventional NAT techniques to various packets. In other examples, NAT rules 54 includes a NAT rule configured in accordance with the techniques of this disclosure that, when applied by NAT module 52, transforms network packets from a first transitioning protocol to a second transitioning protocol. NAT module 52 may, in some instances, apply both conventional NAT rules and a NAT rule configured in accordance with the techniques of this disclosure to packets that are received by relay 30.

Once relay 30 is enabled, initialized and ready to process network traffic, IFCs 40 being to receive outbound network traffic via one of inbound links 41, e.g., inbound link 41A, that originated from subscriber devices 20 and is destined for server 22. IFCs 40 forward this traffic to control unit 32 where forwarding engine 48 directs the traffic to NAT module 52 based on the forwarding information included within FIB 50. In this example, the incoming network traffic is received from subscriber devices 20 via an IPv4 network (e.g., core network 14 of FIG. 1). Because the incoming network traffic comprises IPv4 network packets, NAT module 52 decapsulates the IPv6 packets generated by subscriber devices from the IPv4 packets in accordance with the techniques of the 6 to 4 protocol.

After the IPv6 packet is decapsulated from the IPv4 packet, NAT module 52 applies a NAT rule configured in accordance with the techniques of this disclosure and stored within NAT rules 54 to modify the 6 to 4 source address included within the IPv6 packet. The IPv6 source address is configured in accordance with the 6 to 4 protocol and includes the 6 to 4 prefix as well as the IPv4 address of the residential gateway 18. NAT module 52 applies the NAT rule to the IPv6 source address to remove the 6 to 4 prefix and prepend the 6rd prefix that corresponds to the ISP that provides core network 14. The modified IPv6 network address includes the appropriate 6rd prefix as well as the IPv4 address of the residential gateway 18. After NAT module 52 prepends the appropriate 6rd prefix, NAT module 52 updates the source address of the IPv6 packet with the modified IPv6 source address and returns the packet to data pane 36 where forwarding engine 48 forwards the IPv6 packet via an appropriate one of IFCs 40 as specified by the forwarding information stored in FIB 50.

Relay 30 also receives inbound network traffic via one of inbound links 41, e.g., inbound link 41N, that originated from server 22 and is destined for one of subscriber devices 20. IFCs 40 forward this traffic to control unit 32 where forwarding engine 48 forwards the traffic to NAT module 52 based on the forwarding information included within FIB 50. In this example, the incoming network traffic is received from server 22 via an IPv6 network (e.g., public network 16 of FIG. 1). NAT module 52 applies a NAT rule configured in accordance with the techniques of this disclosure and stored within NAT rules 54 to modify the 6rd destination address included within the IPv6 packet. The IPv6 destination address is configured in accordance with the 6rd protocol and includes the 6rd prefix assigned to the ISP and the IPv4 network address of residential gateway 18. NAT module 52 applies the NAT rule to the IPv6 destination address to remove the 6rd prefix and prepend the well-known 6 to 4 prefix. After NAT module 52 updates with IPv6 packet with the modified IPv6 source address, NAT module 52 encapsulates the IPv6 packet within an IPv4 packet. The IPv4 packet includes an IPv4 destination address that is set to the IPv4 network address of residential gateway 18 of FIG. 1. NAT module 52 then returns the IPv4 packet to data plane 36 where forwarding engine 48 forwards the IPv43 packet via an appropriate one of IFCs 40 as specified in the forwarding information stored in FIB 50.

In some examples, service plane 38 may include additional services modules (not shown in FIG. 2) configured to perform other services, such as firewall, intrusion detection, and virtual private network. In these examples, upon receiving the modified packet from NAT module 52, forwarding engine 48 may direct the modified packet to the additional service modules to receive the additional services. After the additional service modules applies the services, the modified packet is returned to data plane 36 and forwarding engine forwards the modified packet via an appropriate one of IFCs 40 as specified by the forwarding information stored in FIB 50.

Figure 3A:
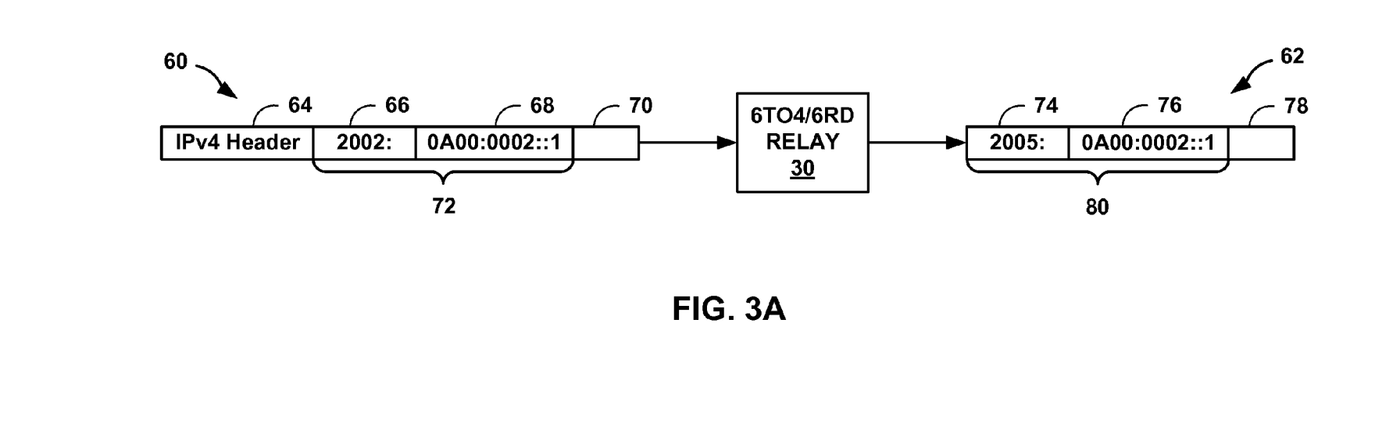
FIGS. 3A and 3B are conceptual diagrams illustrating example packet flows through a 6 to 4/6rd relay in accordance with the techniques of this disclosure.
Figure 3B:
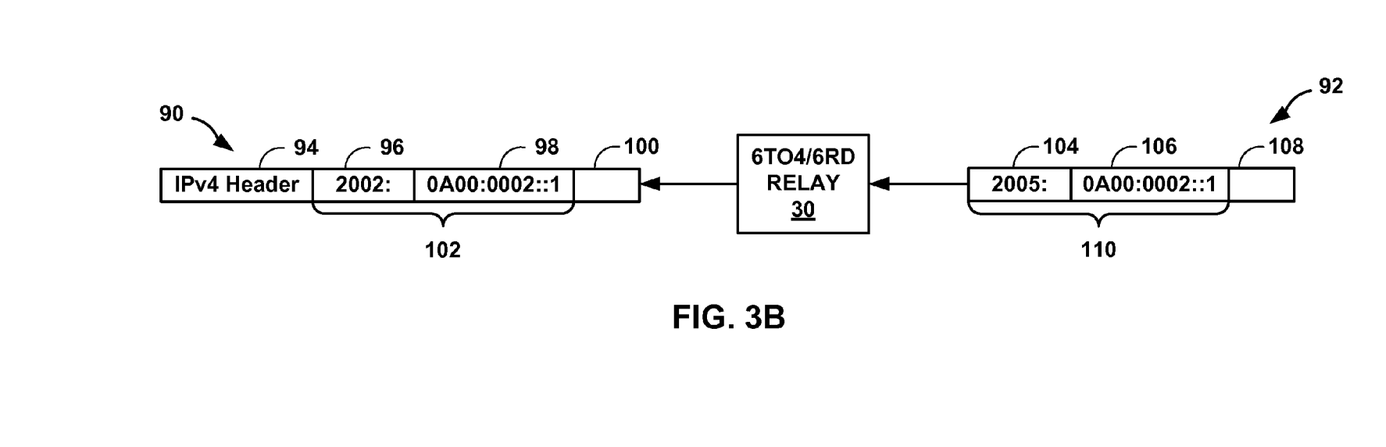

FIGS. 3A and 3B illustrate example conceptual diagrams illustrating example packet flows through a 6 to 4/6rd relay in accordance with the techniques of this disclosure. For purposes of clarity, the examples shown in FIGS. 3A and 3B will be described with respect to network system 2 of FIG. 1 and 6to4/6rd relay 30 of FIG. 2.

In the example illustrated in FIG. 3A, 6 to 4 packet 60 is an outbound packet from one of subscriber devices 20. In this example, 6 to 4 packet 60 is an IPv4 packet configured in accordance with the 6 to 4 protocol that tunnels IPv6 information from subscriber devices 20. 6 to 4 packet 60 includes an IPv4 header 64, an IPv6 source address 72, and an IPv6 payload 70. The IPv6 source address 72 and IPv6 payload 70 are included within the IPv4 packet body, as described by the 6 to 4 protocol. IPv6 source address 72 may be included within an IPv6 header that includes other information not shown for purposes of clarity. IPv6 source address 72 includes 6 to 4 prefix 66 and IPv4 address 68. 6 to 4 prefix 66 is set to the well-known "6 to" prefix, "2002/16." IPv4 address 68 is set to the hexadecimal equivalent of the IPv4 address of residential gateway 18 (e.g., the hexadecimal equivalent of 10.0.0.2, which is 0A00:0002).

Relay 30 receives 6 to 4 packet 60 via core network 14 and applies a NAT rule with NAT module 52 to transform 6 to 4 packet 60 into 6rd packet 62. 6rd packet 62 is an IPv6 packet configured in accordance with the 6rd protocol that tunnels IPv4 information (e.g., the IPv4 address of residential gateway 18). 6rd packet 62 includes an IPv6 source address 80 and IPv6 payload 78. IPv6 source address 80 may be included within an IPv6 header that includes other information not shown for purposes of clarity. The IPv6 source address 80 includes 6rd prefix 74 and IPv4 address 76. 6rd prefix 74 uniquely identifies the ISP that provides access network 12 and/or core network 14 (e.g., "2005/16"). IPv4 address 76 is set to the hexadecimal equivalent of the IPv4 address of residential gateway 18 (e.g., the hexadecimal equivalent of 10.0.0.2, which is 0A00:0002).

In the example illustrated in FIG. 3B, 6rd packet 92 is an inbound packet from server 22 to one of subscriber devices 20. In this example, 6rd packet 92 is an IPv6 packet configured in accordance with the 6rd protocol and tunnels IPv4 information from server 12 towards subscriber devices 20. 6rd packet 92 includes IPv6 destination address 110 and IPv6 payload 108. The IPv6 destination address 110 includes 6rd prefix 104 and IPv4 address 106, and may be included within an IPv6 header having other information not showing for purposes of clarity. 6rd prefix 104 uniquely identifies the ISP that provides access network 12 and/or core network 14 (e.g., "2005/16"). IPv4 address 102 is set to the hexadecimal equivalent of the IPv4 address of residential gateway 18 (e.g., the hexadecimal equivalent of 10.0.0.2, which is 0A00:0002).

Upon receiving 6rd packet 92 from server 22 via public network 16, relay 30 applies a NAT rule with NAT module 52 to transform 6rd packet 92 into 6 to 4 packet 90. 6 to 4 packet 90 is an IPv4 packet configured in accordance with the 6 to 4 protocol and tunnels IPv6 information across core network 14 and access network 12 to residential gateway 18. 6 to 4 packet 90 includes an IPv4 header 94, an IPv6 destination address 102, and an IPv6 payload 100. The IPv6 destination address 102 and IPv6 payload 100 are included within the IPv4 packet body, as described by the 6 to 4 protocol. IPv6 destination address 102 includes 6 to 4 prefix 96 and IPv4 address 98. 6 to 4 prefix 96 is set to the well-known "6 to" prefix, "2002/16" and IPv4 address 98 is set to the hexadecimal equivalent of the IPv4 address of residential gateway 18 (e.g., the hexadecimal equivalent of 10.0.0.2, which is 0A00:0002).

Figure 4:
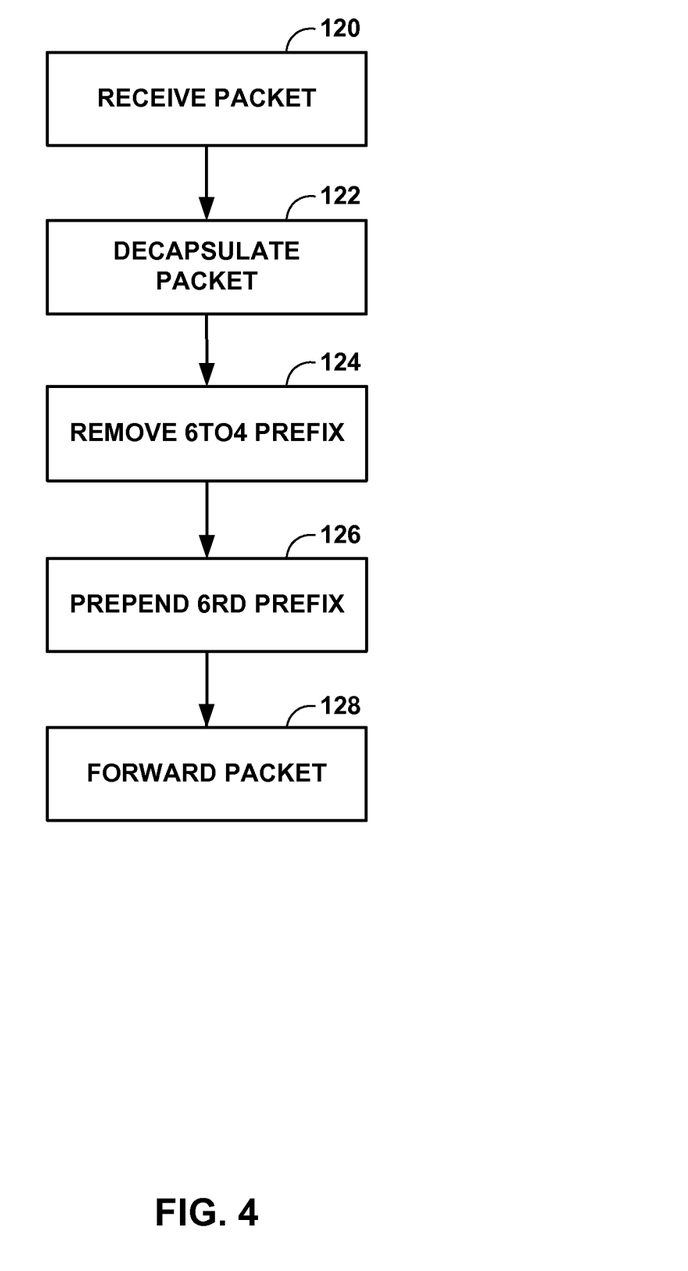
FIG. 4 is a flow chart illustrating an example method for relaying an outbound packet from a 6 to 4 host to an IPv6 host.

FIG. 4 is a flow chart illustrating an example method for relaying an outbound packet from a 6 to 4 host to an IPv6 host. For purposes of clarity, the method shown in FIG. 4 will be described with respect to network system 2 of FIG. 1 and the 6 to 4/6rd relay 30 of FIG. 2. Relay 30 receives a packet via one of IFCs 40 and inbound links 41 (120). In this example, the packet originates from one of subscriber devices 20 and is received via access network 12 and core network 14, which operate as IPv4 networks. As such, the packet comprises an IPv4 packet that encapsulates and IPv6 packet generated by the one of subscriber devices 20 from which the packet was sent in accordance with the 6 to 4 protocol. After relay 30 receives the packet, the one of IFCs 40 directs the packet to data plane 36 where forwarding engine 38 passes the packet to service plane 38.

NAT module 52 of service plane 38 decapsulates the IPv6 packet from the IPv4 packet (122). As described by the 6 to 4 protocol, the IPv6 packet, including the IPv6 header and payload, is included within the body of the IPv4 packet. The IPv6 header includes an IPv6 source address and an IPv6 destination address. NAT module 52 extracts the IPv6 source address from the IPv6 header and applies a NAT rule to the IPv6 source address. The NAT rule causes the NAT module 52 to modify the IPv6 source address from a 6 to 4 network address into a 6rd network address. The NAT module 52 modifies the IPv6 source address by removing the 6 to 4 prefix from the IPv6 source address (124).

Once the 6 to 4 prefix is removed, the IPv4 source address of the residential gateway 18 is remaining NAT module 52 then prepends the 6rd prefix associated with the ISP to the IPv4 source address to generate the modified IPv6 source address (126). NAT module 52 then modifies the IPv6 headers with the modified IPv6 source address to generate the 6rd packet prior to directing the 6rd packet to data plane 36. Forwarding engine 48 of data plane 36 then forwards the 6rd packet out one of IFCs 40 and outbound links 43 in accordance with the forwarding information stored within FIB 50 (128).

Figure 5:
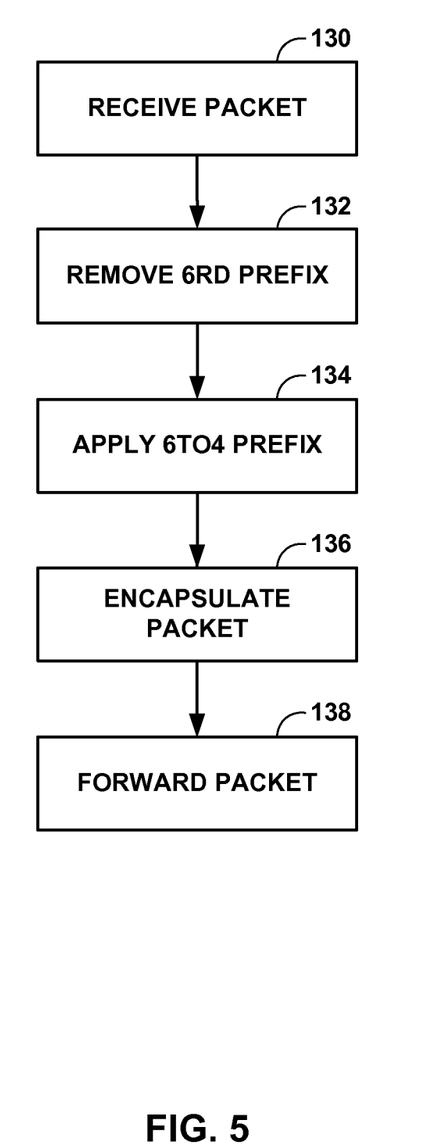
FIG. 5 is a flow chart illustrating an example method for relaying an inbound packet from an IPv6 host to a 6 to 4 host.

FIG. 5 is a flow chart illustrating an example method for relaying an inbound packet from an IPv6 host to a 6 to 4 host. For purposes of clarity, the method shown in FIG. 5 will be described with respect to network system 2 of FIG. 1 and the 6 to 4/6rd relay 30 of FIG. 2. Relay 30 receives a packet via one of IFC 40 and inbound links 41 (130). In this example, the packet originates from server 22, which operates as a 6rd host, and is received via public network 16, which operates as an IPv6 network. As such, the packet comprises an IPv6 packet configured in accordance with the 6rd protocol. After relay 30 receives the packet, the one of IFCs 40 directs the packet to data plane 36 where forwarding engine 38 passes the packet to service plane 38.

NAT module 52 of service plane 38 extracts the IPv6 destination address from the IPv6 header of the IPv6 packet and applies a NAT rule to the IPv6 destination address. The NAT rule causes the NAT module 52 to change the IPv6 destination address from a 6rd network address into a 6 to 4 network address. First, the NAT module 52 modifies the IPv6 destination address by removing the 6rd prefix from the IPv6 source address (132). Once the 6rd prefix is removed, the IPv4 source address of the residential gateway 18 is remaining. The NAT module 52 then prepends the well-known 6 to 4 prefix to the IPv4 source address to generate the modified IPv6 destination address (134) and updates the IPv6 headers with the modified IPv6 destination address to generate the modified IPv6 packet.

After NAT module 52 generates the modified IPv6 packet, NAT module 52 encapsulates the modified IPv6 packet within an IPv4, as described by the 6 to 4 protocol (136). The IPv4 packet includes the IPv4 address of residential gateway 18 as the IPv4 destination address and the IPv4 address of relay 24 as the IPv4 source address as well as the entire IPv6 packet within the IPv4 packet body. NAT module 52 then passes the IPv4 packet back to data plane 36 where forwarding engine 48 forwards the IPv4 packet out one of IFCs 40 and outbound links 43 in accordance with the forwarding information stored within FIB 50 (138).

Figure 6:
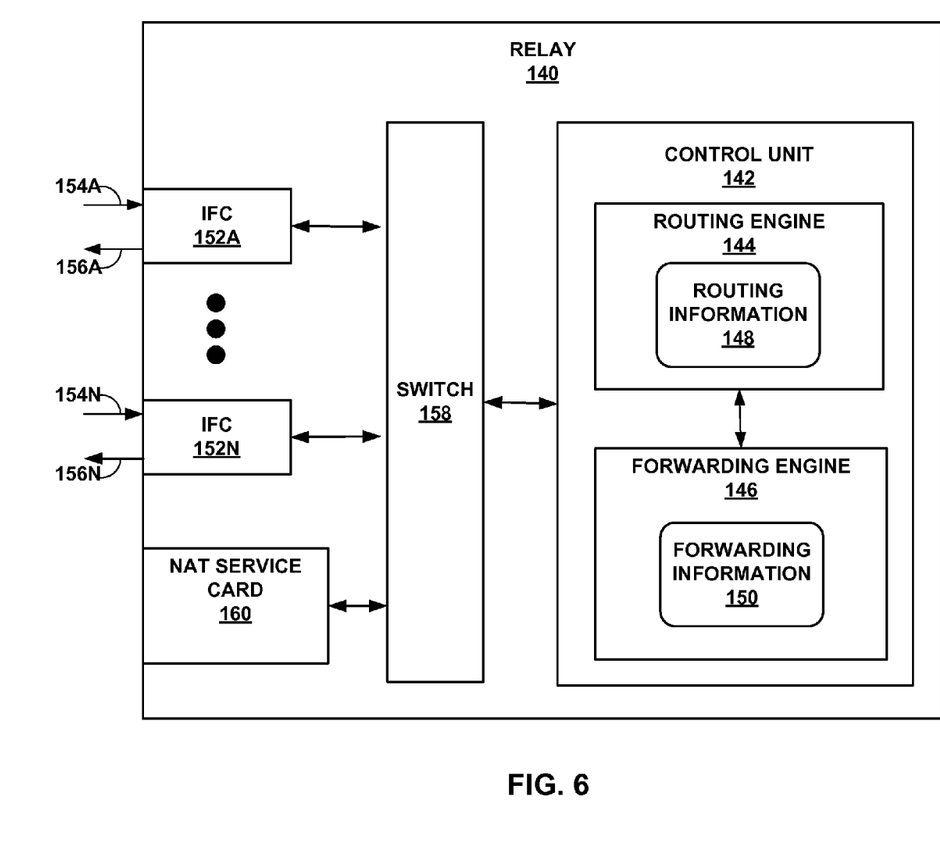
FIG. 6 is a block diagram illustrating another example 6TO4/6RD relay 80 that may implement the techniques of this disclosure.

FIG. 6 is a block diagram illustrating another example relay 140 that may implement the techniques of this disclosure. Although described with respect to relay 140, any network device capable of performing NAT to convert between 6 to 4 and 6rd network address may implement the techniques described herein and the techniques should not be limited to the example set forth in FIG. 6.

As shown in FIG. 6, relay 140 includes control unit 142 that comprises a routing engine 144 and a forwarding engine 146. Routing engine 144 is primarily responsible for maintaining routing information 148 to reflect the current topology of a network and other network entities to which it is connected. In particular, routing engine 144 maintains routing information 148 to accurately reflect the topology of the network and other entities. In accordance with routing information 148, forwarding engine 146 maintains forwarding information 150 that associates network destinations with specific next hops and corresponding interfaces ports.

Relay 140 includes a set of interface cards (IFCs) 152A-152N ("IFCs 152") for communicating packets via inbound links 154A-154N ("inbound links 154") and outbound links 156A-156N ("outbound links 156"). Each of IFCs 152 couple to and communicate with control unit 142 via switch 158. Switch 158 may comprise any communication medium capable of communicatively coupling one or more endpoints, e.g., IFCs 152, control unit 142, and a network address translation (NAT) service card 160 ("NAT service card 160"). Forwarding engine 146 may receive packet forwarded via switch 158 from IFCs 152 and forward those packets via switch 158 and IFCs 152 on outbound links 156 according to forwarding information 150. In this manner, forwarding engine 156 provides the forwarding functionality of relay 140.

Relay 140 also includes above noted NAT service card 160. In some embodiments, NAT service card 160 includes a module similar to NAT module 52 shown in FIG. 2. NAT service card 160 may be referred to as a service plane entity in that it resides in a service plane separate from the routing and forwarding planes represented by routing engine 144 and forwarding engine 146, respectively. This service plane entity, which is commonly abbreviated as "SPE," may provide an interface by which one or more cards may be inserted into a chassis. Each of these cards may include one or more distributed NAT modules while the SPE executes the NAT module. Regardless of the implementation details, NAT service card 160 may implement the techniques described in this disclosure to transform the network packets conforming to a first transitioning protocol into network packets conforming to a second transitioning protocol.

To illustrate the flow of packets with respect to the exemplary configuration of relay 140, assume relay 140 replaces relay 24 of FIG. 1 and that one of IFCs 152, e.g., IFC 152A, may receive an output packet originated by one of subscriber devices 20, e.g., subscriber device 20A. IFC 152A forwards this packet to forwarding engine 156 via switch 158, where forwarding engine 156 forwards this packet to NAT service card 160. Upon converting the packet between 6rd and 6 to 4 in accordance with the techniques of this disclosure as described in more detail above, NAT service card 160 forwards the modified packet generated as a result of performing these techniques back to forwarding engine 156. Forwarding engine 156 then forwards this modified packet via an appropriate one of IFCs 152 as specified by forwarding information 150.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable media, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various embodiments of the invention have been described. These and other embodiments are within the scope of the following claims.

The invention claimed is:

1. A method comprising:
  receiving, with a network device, a message via a first network, wherein the message conforms to a first transitioning protocol, and wherein the network device couples the first network operating in accordance with a first network-layer protocol with a second network operating in accordance with a second network-layer protocol;
  transforming, with the network device, the message from conforming to the first transitioning protocol to conforming to a second transitioning protocol, wherein the first and second transitioning protocols are different transitioning protocols for transitioning between Internet Protocol version 4 (IPv4) and Internet Protocol version 6 (IPv6), and wherein each of the first and second transitioning protocol use a different format for tunneling network packets of the first network-layer protocol over the second network operating in accordance with the second network-layer protocol; and
  forwarding, with the network device, the message via the second network.

2. The method of claim 1, wherein transforming the message comprises applying a network address translation rule to the message to cause the network device to transform the message from conforming to the first transitioning protocol to conforming to the second transitioning protocol.

3. The method of claim 2, wherein the message includes a network address that conforms to the first transitioning protocol, and wherein applying the network address translation rule comprises:
  removing a prefix that conforms to the first transitioning protocol from the network address; and
  prepending a different prefix that conforms to the second transitioning protocol to the network address.

4. The method of claim 1, further comprising:
  receiving, with the network device, another message, wherein the other message includes network address information;
  applying, with the network device, a conventional network address translation rule to the other message to change the network address information; and
  forwarding the other message via the first network or the second network based on the network address information.

5. The method of claim 1, wherein the first network operates in accordance with Internet Protocol version 4 (IPv4), wherein the second network operates in accordance with Internet Protocol version 6 (IPv6), and wherein the message comprises an IPv6 packet encapsulated within an IPv4 packet, the method further comprising:

prior to transforming the message, decapsulating the IPv4 packet to extract the IPv6 packet.

6. The method of claim 1, wherein the first network operates in accordance with Internet Protocol version 6 (IPv6), wherein the second network operates in accordance with Internet Protocol version 4 (IPv4), and wherein the message comprises an IPv6 packet, the method further comprising:

encapsulating the IPv6 packet in an IPv4 packet prior to forwarding the message via the second network.

7. The method of claim 1, wherein the first transitioning protocol is a 6 to 4 network protocol, and wherein the second transitioning protocol is a 6rd network protocol.

8. The method of claim 1, wherein the first transitioning protocol is a 6rd protocol, and wherein the second transitioning protocol is a 6 to 4 protocol.

9. A non-transitory computer-readable storage medium encoded with instructions for causing one or more programmable processors to:

receive a message via a first network, message conforms to a first transitioning protocol, and wherein the first network operates in accordance with a first network-layer protocol;

transform the message from conforming to the first transitioning protocol to conforming to a second transitioning protocol, wherein the first and second transitioning protocols are different transitioning protocols for transitioning between Internet Protocol version 4 (IPv4) and Internet Protocol version 6 (IPv6), and wherein each of the first and second transitioning protocol use a different format for tunneling network packets of the first network-layer protocol over the second network operating in accordance with the second network-layer protocol; and forward the message via a second network, the second network operates in accordance with a second network-layer protocol.

10. The non-transitory computer-readable storage medium of claim 9, wherein the instructions further cause the one or more programmable processors to:

apply a network address translation rule to the message to transform the message from conforming to the first transitioning protocol to conforming to the second transitioning protocol.

11. The non-transitory computer-readable storage medium of claim 10, wherein the message includes a network address that conforms to the first transitioning protocol, and wherein the instructions further cause the one or more programmable processors to:

remove a prefix that conforms to the first transitioning protocol from the network address; and prepend a different prefix that conforms to the second transitioning protocol to the network address.

12. The non-transitory computer-readable storage medium of claim 9, wherein the instructions further cause the one or more programmable processors to:

receive another message, wherein the other message includes network address information;

apply a conventional network address translation rule to the other message to change the network address information; and forward the other message via the first network or the second network based on the network address information.

13. The non-transitory computer-readable storage medium of claim 9, wherein the first network operates in accordance with Internet Protocol version 4 (IPv4), wherein the second network operates in accordance with Internet Protocol version 6 (IPv6), wherein the message comprises an IPv6 packet encapsulated within an IPv4 packet, and wherein the instructions further cause the one or more programmable processors to:

prior to transforming the message, decapsulate the IPv4 packet to extract the IPv6 packet.

14. The non-transitory computer-readable storage medium of claim 9, wherein the first network operates in accordance with Internet Protocol version 6 (IPv6), wherein the second network operates in accordance with Internet Protocol version 4 (IPv4), wherein the message comprises an IPv6 packet, and wherein the instructions further cause the one or more programmable processors to:

encapsulate the IPv6 packet in an IPv4 packet prior to forwarding the message via the second network.

15. A network device comprising:

one or more network interface cards configured to send and receive messages with a first network operating in accordance with a first network-layer protocol and a second network operating in accordance with a second network-layer protocol; and a control unit configured to receive a message via the one or more network interface cards, transform the message from conforming to a first transitioning protocol to conforming to a second transitioning protocol, and forward the message via the second network, wherein the first and second transitioning protocols are different transitioning protocols for transitioning between Internet Protocol version 4 (IPv4) and Internet Protocol version 6 (IPv6), and wherein each of the first and second transitioning protocol use a different format for tunneling network packets of the first network-layer protocol over the second network operating in accordance with the second network-layer protocol.

16. The network device of claim 15, wherein the control unit comprises:

a data storage repository configured to store a set of network address translation rules; and a network address translation module configured to apply one of the set of network address translation rules to the message to transform the message from conforming to the first transitioning protocol to conforming to the second transitioning protocol.

17. The network device of claim 16, wherein the message includes a network address that conforms to the first transitioning protocol, and wherein the network address translation module is further configured to remove a prefix that conforms to the first transitioning protocol from the network address, and prepend a different prefix that conforms to the second transitioning protocol to the network address.

18. The network device of claim 16, wherein the control unit is further configured to receive another message via the one or more network interface cards, and forward the other message via the first network or the second network based on a network address included in the other message, and wherein the network address translation module is further configured to apply a different one of the set of network address translation rules to the other message in order to change the network address prior to the control unit forwarding the other message, wherein the different network address translation rule comprises a conventional network address translation rule.

19. The network device of claim 15,
wherein the first network operates in accordance with Internet Protocol version 4 (IPv4),
wherein the second network operates in accordance with Internet Protocol version 6 (IPv6),
wherein the message comprises an IPv6 packet encapsulated within an IPv4 packet, and
wherein the control unit is further configured to decapsulate the IPv4 packet to extract the IPv6 packet prior to transforming the message.

20. The network device of claim 15,
wherein the first network operates in accordance with Internet Protocol version 6 (IPv6),
wherein the second network operates in accordance with Internet Protocol version 4 (IPv4),
wherein the message comprises an IPv6 packet, and
wherein the control unit is further configured to encapsulate the IPv6 packet in an IPv4 packet prior to forwarding the message via the second network.

21. A method comprising:
receiving, with a network device, a message via a first network, wherein the message conforms to a first transitioning protocol, and wherein the network device couples the first network operating in accordance with a first network-layer protocol with a second network operating in accordance with a second network-layer protocol;
transforming, with the network device, the message from conforming to the first transitioning protocol to conforming to a second transitioning protocol, wherein the first and second transitioning protocols are different transitioning protocols for transitioning between Internet Protocol version 4 (IPv4) and Internet Protocol version 6 (IPv6), wherein each of the first and second transitioning protocol use a different format for tunneling network packets of the first network-layer protocol over the second network operating in accordance with the second network-layer protocol, wherein the first transitioning protocol is either 1) a 6 to 4 network protocol or 2) a 6rd network protocol, and wherein the second transitioning protocol is the other one of the 6 to 4 network protocol and the 6rd network protocol; and
forwarding, with the network device, the message via the second network.

\* \* \* \* \*